3,148,561
ADJUSTABLE BORING TOOL
Edmund A. Krampert, 63 Airmount Ave., Ramsey, N.J.
Filed Nov. 19, 1959, Ser. No. 854,169
1 Claim. (Cl. 77—58)

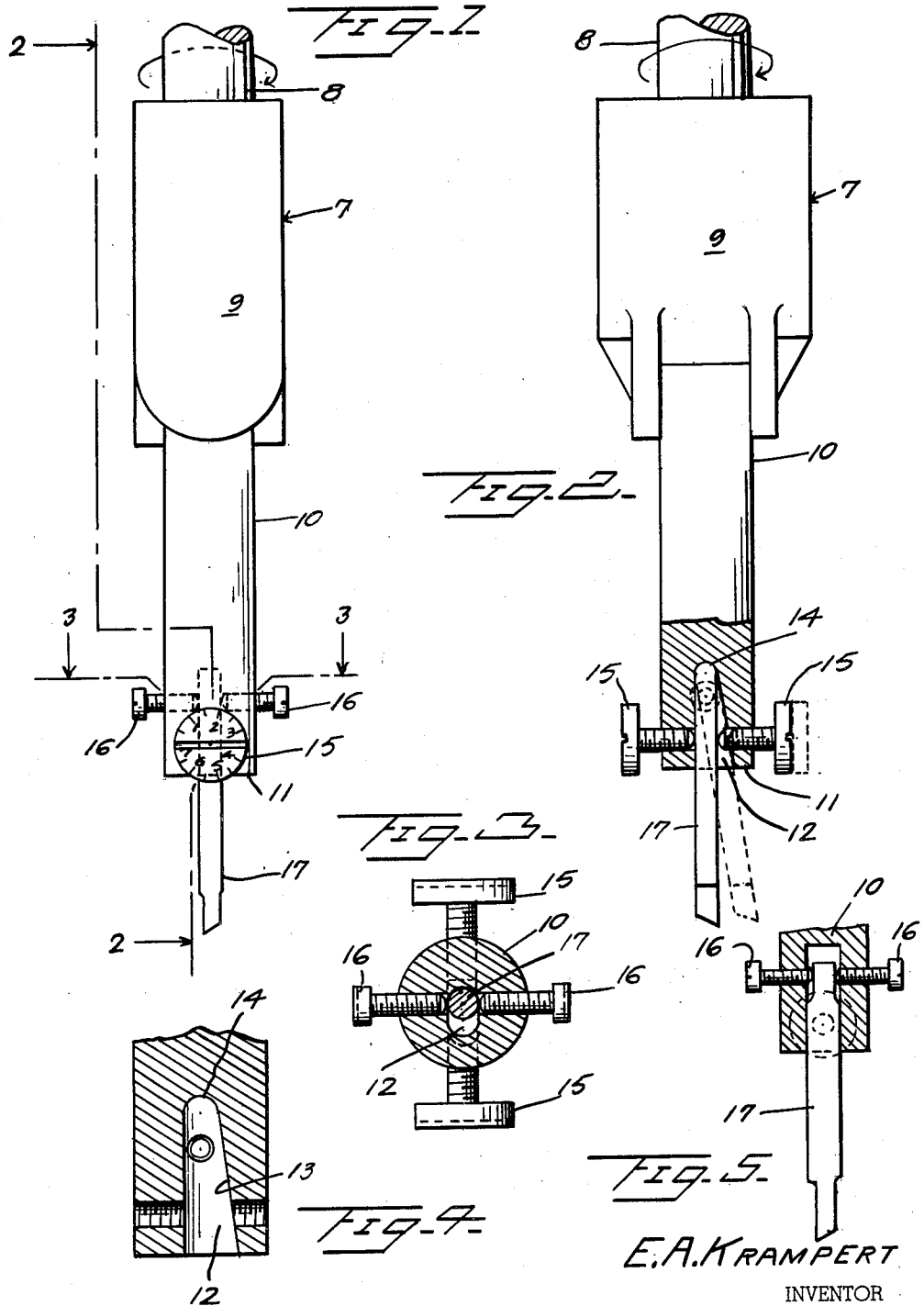

This invention relates to boring tools, and more particularly to a boring tool that has as one of its principal objects to provide a boring tool which is so constructed and arranged that its cutter may be adjusted to bore a hole of any desired diameter within its constructed range.

Another object of this invention is to provide an adjustable boring tool having a cutter that can readily be replaced when worn beyond use, or whenever it is desirable to use a cutter of a different shape.

Another object of this invention is to provide an adjustable boring tool having adjusting screws formed with graduations on the heads thereof so that the boring tool may be set for accurately cutting the identical cut in different pieces of work.

Still another object of this invention is to provide an adjustable boring tool with a minimum size of head that will not interfere with the vision of the operator when the cut is being made by the tool.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit and intent of the invention as claimed.

Referring to the drawings:

FIGURE 1 is a plan view of this invention.

FIG. 2 is a view sectional part, taken substantially along the line 2—2 of FIG. 1 as viewed in the direction indicated by the arrows.

FIG. 3 is a sectional view taken substantially along the line 3—3 of FIG. 1 as viewed in the direction indicated by the arrows.

FIG. 4 is a sectional view of a fragmentary detail of this invention.

FIG. 5 is a sectional view in part, of a fragmentary detail of this invention.

Similar reference characters refer to similar parts throughout the several views of the drawing.

Having reference now to the drawing in detail, and in particular to FIG. 1, there is generally indicated by the reference character 7 a tool holder having a shank 8 terminating at one end in a body 9 which in turn is elongated to form an elongated member 10 whose outer end 11 contains a recess 12 which is elongated as viewed from the end. The recess 12 has a tapered side 13 and three other sides that are parallel to the sides of the aforementioned elongated member 10, the recess terminating in a rounded end 14 as clearly shown in FIGS. 2 and 4 of the drawing.

The elongated member 10 is provided with twin pairs of tapped openings in the outer portion thereof, one pair of tapped openings being at right angles to the other pair of tapped openings, as clearly shown in FIG. 3 of the drawing. It is also to be noted on examination of FIG. 3 that all of the aforementioned tapped openings extend into the recess 12 and that graduated pan head machine screws 15 are screwed in the openings nearest the outer end 11 of the tool, while modified fillister head machine screws 16 are screwed in the second pair of tapped openings. A tool bit 17 is inserted in the recess 12 and secured in the desired position by first tightening the screws 16 and then by loosening one screw 15 and tightening the other screw until the tool bit is in the desired position, a typical one of which is shown by the dash lines in FIG. 2.

It is understood of course by those experienced in the art that the shank 8 of this tool holder 7 is first placed in a tool holder in any desired lathe, milling machine or other machine tool suitable for cutting metal through the use of tool bits or the like.

From the foregoing it will now be seen that there is herein provided an adjustable boring tool which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense.

I claim:

An adjustable boring tool comprising a body having one end terminating in a shank portion secured in a tool holder of a machine, the other end of said body terminating in an elongated member having a circular cross section, said elongated member having portions defining an axial bore extending longitudinally inwardly from the free end thereof, one wall of said bore divergent from the inner end thereof, an opposite wall of said bore being substantially parallel to the longitudinal axis of said elongated member, the bore defined by the said portions of the elongated member being elliptical in horizontal cross section for substantially its entire length, portions of said elongated member inwardly spaced from the free end thereof defining a first pair of diametrically opposed transverse threaded openings extending therethrough into said elliptical bore, other portions of said elongated member adjacent the free end thereof defining a second pair of diametrically opposed transverse threaded openings extending therethrough into said elliptical bore, the axis of said second pair of threaded openings, disposed at right angles to the axis of said first pair of threaded openings, a cutting tool having a portion thereof residing in said elliptical bore, screws in said first pair of openings in engagement with said cutting tool to pivotally secure the same in said bore, said cutting tool only pivotal in an arc to one side of the longitudinal axis of said bore and micrometer screws in said second pair of openings to secure said cutting tool in selected angular positions with respect to the longitudinal axis of said elongated member.

References Cited in the file of this patent
UNITED STATES PATENTS

| | | |
|---|---|---|
| 739,750 | Warburton | Sept. 22, 1903 |
| 1,493,051 | O'Brien | May 6, 1924 |
| 1,935,493 | Wellington | Nov. 14, 1933 |
| 2,931,254 | Briney | Apr. 5, 1960 |

FOREIGN PATENTS

| | | |
|---|---|---|
| 84,483 | Switzerland | Mar. 16, 1920 |